(12) United States Patent
Liu

(10) Patent No.: US 10,318,423 B2
(45) Date of Patent: Jun. 11, 2019

(54) METHODS AND SYSTEMS FOR MANAGING PHYSICAL INFORMATION OF MEMORY UNITS IN A MEMORY DEVICE

(71) Applicant: Macronix International Co., Ltd., Hsinchu (TW)

(72) Inventor: Yi-Chun Liu, Zhubei (TW)

(73) Assignee: Macronix International Co., Ltd., Hsinchu (TW)

( * ) Notice: Subject to any disclaimer, the term of this patent is extended or adjusted under 35 U.S.C. 154(b) by 219 days.

(21) Appl. No.: 15/378,508

(22) Filed: Dec. 14, 2016

(65) Prior Publication Data

US 2018/0165198 A1 Jun. 14, 2018

(51) Int. Cl.
| | |
|---|---|
| *G06F 12/0815* | (2016.01) |
| *G06F 12/0817* | (2016.01) |
| *G06F 12/0891* | (2016.01) |
| *G06F 12/0895* | (2016.01) |
| *G06F 12/1009* | (2016.01) |

(52) U.S. Cl.
CPC ...... *G06F 12/0815* (2013.01); *G06F 12/0817* (2013.01); *G06F 12/0891* (2013.01); *G06F 12/0895* (2013.01); *G06F 12/1009* (2013.01); *G06F 2212/60* (2013.01); *G06F 2212/621* (2013.01)

(58) Field of Classification Search
CPC ............ G06F 12/0815; G06F 12/0891; G06F 12/0817; G06F 12/0895; G06F 12/1009; G06F 12/121; G06F 12/122; G06F 12/127; G06F 2212/60; G06F 2212/621

USPC ................. 711/144, 202, 205, 206, 207, 208
See application file for complete search history.

(56) References Cited

U.S. PATENT DOCUMENTS

| | | | |
|---|---|---|---|
| 2006/0136656 A1 | 6/2006 | Conley et al. | |
| 2006/0156155 A1* | 7/2006 | Gurumurthi | ........ G06F 11/0793 714/746 |
| 2008/0250202 A1 | 10/2008 | Conley et al. | |
| 2010/0332730 A1 | 12/2010 | Royer, Jr. et al. | |

(Continued)

OTHER PUBLICATIONS

Gupta et al., "DFTL: A Flash Translation Layer Employing Demand-based Selective Caching of Page-level Address Mappings", Dept. of Computer Science and Engineering, The Pennsylvania State University, ASPLOS '09, Mar. 7-11, 2009, 12 pages.

*Primary Examiner* — Shane D Woolwine
(74) *Attorney, Agent, or Firm* — Fish & Richardson P.C.

(57) ABSTRACT

A request is received to access physical information of a memory unit included in a memory device. A determination is made whether the physical information is available in a physical information table present in a memory cache. If the physical information of the memory unit is available in the table, the physical information is accessed from the table. If the physical information is not available in the table, a global directory in the memory cache is accessed, which indicates locations in a non-volatile memory that store the total number of the physical information blocks. From the global directory, a particular location in the non-volatile memory storing a particular physical information block that includes the physical information of the memory unit is determined. The particular physical information block is loaded into the table and the physical information of the memory unit is accessed from the particular physical information block.

22 Claims, 5 Drawing Sheets

(56) References Cited

U.S. PATENT DOCUMENTS

| | | | |
|---|---|---|---|
| 2011/0078369 A1* | 3/2011 | Sauber | G06F 12/1009 711/104 |
| 2013/0166816 A1 | 6/2013 | Atkisson et al. | |
| 2013/0246693 A1 | 9/2013 | Lee et al. | |
| 2015/0356020 A1 | 12/2015 | Desai et al. | |
| 2017/0024326 A1* | 1/2017 | Luo | G06F 12/1009 |

* cited by examiner

METHODS AND SYSTEMS FOR MANAGING PHYSICAL INFORMATION OF MEMORY UNITS IN A MEMORY DEVICE

TECHNICAL FIELD

The following disclosure relates generally to methods and systems for managing physical information of memory units in a memory device.

BACKGROUND

Some memory devices maintain physical information about the physical status of the constituent memory units, e.g., at the granularity of memory blocks, pages, or sub-pages. Sometimes the physical information is accessed when performing memory operations.

SUMMARY

The present disclosure describes techniques and systems to manage physical information of memory units in a memory device. In some implementations, the memory device includes non-volatile storage memory, such as flash memory, and a device controller with a cache memory, such as random access memory (RAM). The memory device records the physical information about all memory units in the memory device in physical information blocks that are stored in the non-volatile memory. A memory unit corresponds to a portion of the non-volatile memory, e.g., a memory block, a page or a sub-page. A smaller portion of the physical information blocks, e.g. one or more chunks corresponding to a subset of the physical information blocks, which include physical information about a subset of the memory units in the non-volatile memory, are stored in the cache memory. The chunks are stored in a data structure in the cache memory that is referred to as a cache physical information table. The device controller also maintains in the cache memory a global directory that indicates the locations of the physical information blocks in the non-volatile memory.

When a request to access physical information of a memory unit is received (e.g., when performing garbage collection for the memory unit), the device controller first checks whether the requested physical information is present in the cache physical information table. If yes, the device controller responds to the request by providing the physical information from the cache. If the requested physical information is not present in the cache, then the device controller determines, using the global directory, where in the non-volatile memory the physical information block with the requested physical information is present. Upon determining the location in the non-volatile memory, the device controller loads a chunk that includes the target physical information block into an entry in the cache physical information table.

In some implementations, to load a chunk into the cache physical information table, an existing chunk has to be evicted from the table, e.g. when there are no empty spaces available in the cache physical information table. Before evicting a chunk, the device controller checks whether one or more entries in the chunk are dirty, e.g., the physical status of the corresponding memory units have changed since the chunk was loaded into the cache physical information table. The clean or dirty state of a chunk is indicated by the value of an associated flag bit. Chunks with dirty physical information are written back to the non-volatile memory before eviction from the cache physical information table. Upon writing back to the non-volatile memory, the dirty flags are cleared, and the entry in the cache physical information table is overwritten with the new chunk that includes the requested physical information. The device controller then responds to the request by providing the physical information from the newly loaded chunk.

In a general aspect, physical information of memory units in a memory device are managed by receiving a request to access physical information of a memory unit included in the memory device. In response to receiving the request, a determination is made whether the physical information of the memory unit is available in a table present in a memory cache, the table storing information corresponding to a subset of a total number of physical information blocks that include physical information of a plurality of memory units in the memory device. Conditioned on determining that the physical information of the memory unit is available in the table, the physical information of the memory unit is accessed from the table. Conditioned on determining that the physical information of the memory unit is not available in the table, a global directory present in the memory cache is accessed. The global directory indicates locations in a non-volatile memory that store the total number of the physical information blocks. From the global directory, a particular location in the non-volatile memory storing a particular physical information block that includes the physical information of the memory unit is determined. In response to the determination, the particular physical information block from the particular location in the non-volatile memory is loaded into the table. The physical information of the memory unit is accessed from the particular physical information block loaded into the table.

Particular implementations may include one or more of the following features. The table may store one or more memory chunks, each memory chunk including one or more entries that store physical information of one or more memory units included in a physical information block in the subset of the total number of physical information blocks. Determining whether the physical information of the memory unit is available in the table may comprise determining whether a memory chunk corresponding to the particular physical information block is present in the table. The global directory may include entries indicating locations in the non-volatile memory that store a total number of memory chunks corresponding to the total number of physical information blocks.

The table may store one or more memory chunks, each memory chunk including one or more entries that store physical information of one or more memory units included in a physical information block in the subset of the total number of physical information blocks. Loading the particular physical information block from the particular location in the non-volatile memory into the table may comprise accessing, in the particular location in the non-volatile memory, a particular memory chunk corresponding to the particular physical information block, and loading the particular memory chunk into the table.

Loading the particular memory chunk into the table may comprise identifying an existing memory chunk present in the table for eviction. A determination may be made whether physical information of one or more memory units associated with the existing memory chunk have been updated. Conditioned on determining that the physical information of the one or more memory units associated with the existing memory chunk have not been updated, the existing memory chunk may be replaced with the particular memory chunk.

Conditioned on determining that the physical information of the one or more memory units associated with the existing memory chunk have been updated, a determination may be made, from the global directory, of a second location in the non-volatile memory storing a second physical information block corresponding to the existing memory chunk. In response to determining the second location, the second physical information block in the non-volatile memory may be accessed. One or more memory units in the second physical information block that correspond to the one or more memory units associated with the existing memory chunk with the updated physical information may be identified. Physical information for the identified one or more memory units in the second physical information block may be updated with the updated physical information from corresponding memory units in the existing memory chunk. The existing memory chunk may be replaced with the particular memory chunk.

Each memory unit in the table may include a dirty flag that indicates whether the physical information of the memory unit has been updated. Determining whether the physical information of the one or more memory units associated with the existing memory chunk have been updated may comprise checking a status of an associated dirty flag for each of the one or more memory units. Conditioned on the associated dirty flag being a first value, a determination may be made that the physical information for the memory unit has been updated. Conditioned on the associated dirty flag being a second value, a determination may be made that the physical information for the memory unit has not been updated.

Each memory unit in the table includes a dirty flag that indicates whether the physical information of the memory unit has been updated. Updating the physical information for the identified one or more memory units in the second physical information block with the updated physical information from corresponding memory units in the existing memory chunk may comprise clearing values of one or more dirty flags associated with the corresponding memory units in the table in response to updating the physical information for the identified one or more memory units in the second physical information block.

Physical status for one or more memory units present in the table may be monitored. Receiving the request to access the physical information of the memory unit may comprise receiving a request to update the physical status of the memory unit. In response to receiving the request to update the physical status of the memory unit, an entry in the table that is associated with the memory unit may be updated. The entry may include physical information of the memory unit. A dirty flag associated with the entry may be set to a first value that indicates that the physical information of the memory unit associated with the entry has been updated.

Monitoring the physical status for the one or more memory units may comprise checking at least one of threshold voltage setting, a health status or a validity status for each memory unit. Updating the entry in the table that is associated with the memory unit may comprise updating one or more bits included in the entry, the one or more bits representing at least one of a threshold voltage setting for the memory unit, a health status for the memory unit, a validity status for the memory unit, an encode type for content of the memory unit, a bit error rate for the memory unit, or one of an erase, program, or read count for the memory unit.

Receiving the request to update the physical status of the memory unit may comprise receiving the request to update the physical status of the memory unit following a read or write operation for the memory unit.

A memory unit may include one of a memory block, a memory page, or a memory sub-page.

In another general aspect, a memory system comprises a non-volatile memory that includes a plurality of memory units; a cache memory that is coupled to the non-volatile memory; and a device controller that is coupled to the non-volatile memory and the cache memory. The device controller is configured to receive a request to access physical information of a memory unit included in the non-volatile memory. In response to receiving the request, the device controller determines whether the physical information of the memory unit is available in a table present in the cache memory, the table storing information corresponding to a subset of a total number of physical information blocks that include physical information of a plurality of memory units. Conditioned on determining that the physical information of the memory unit is available in the table, the device controller accesses the physical information of the memory unit from the table. Conditioned on determining that the physical information of the memory unit is not available in the table, the device controller accesses a global directory present in the cache memory, the global directory indicating locations in the non-volatile memory that store the total number of the physical information blocks. The device controller determines, from the global directory, a particular location in the non-volatile memory storing a particular physical information block that includes the physical information of the memory unit. In response to the determination, the device controller loads the particular physical information block from the particular location in the non-volatile memory into the table, and accesses the physical information of the memory unit from the particular physical information block loaded into the table.

Particular implementations may include one or more of the following features. The table may store one or more memory chunks, each memory chunk including one or more entries that store physical information of one or more memory units included in a physical information block in the subset of the total number of physical information blocks. Determining whether the physical information of the memory unit is available in the table may comprise determining whether a memory chunk corresponding to the particular physical information block is present in the table. The global directory may include entries indicating locations in the non-volatile memory that store a total number of memory chunks corresponding to the total number of physical information blocks.

The table may store one or more memory chunks, each memory chunk including one or more entries that store physical information of one or more memory units included in a physical information block in the subset of the total number of physical information blocks. Loading the particular physical information block from the particular location in the non-volatile memory into the table may comprise accessing, in the particular location in the non-volatile memory, a particular memory chunk corresponding to the particular physical information block, and loading the particular memory chunk into the table.

Loading the particular memory chunk into the table may comprise identifying an existing memory chunk present in the table for eviction. A determination may be made whether physical information of one or more memory units associated with the existing memory chunk have been updated. Conditioned on determining that the physical information of the one or more memory units associated with the existing memory chunk have not been updated, the existing memory chunk may be replaced with the particular memory chunk. Conditioned on determining that the physical information of the one or more memory units associated with the existing memory chunk have been updated, a determination may be made, from the global directory, of a second location in the non-volatile memory storing a second physical information block corresponding to the existing memory chunk. In response to determining the second location, the second physical information block in the non-volatile memory may be accessed. One or more memory units in the second physical information block that correspond to the one or more memory units associated with the existing memory chunk with the updated physical information may be identified. Physical information for the identified one or more memory units in the second physical information block may be updated with the updated physical information from corresponding memory units in the existing memory chunk. The existing memory chunk may be replaced with the particular memory chunk.

Each memory unit in the table may include a dirty flag that indicates whether the physical information of the memory unit has been updated. Determining whether the physical information of the one or more memory units associated with the existing memory chunk have been updated may comprise checking a status of an associated dirty flag for each of the one or more memory units. Conditioned on the associated dirty flag being a first value, a determination may be made that the physical information for the memory unit has been updated. Conditioned on the associated dirty flag being a second value, a determination may be made that the physical information for the memory unit has not been updated.

Each memory unit in the table may include a dirty flag that indicates whether the physical information of the memory unit has been updated. Updating the physical information for the identified one or more memory units in the second physical information block with the updated physical information from corresponding memory units in the existing memory chunk may comprise clearing values of one or more dirty flags associated with the corresponding memory units in the table in response to updating the physical information for the identified one or more memory units in the second physical information block.

The device controller may be further configured to monitor physical status for one or more memory units present in the table. Receiving the request to access the physical information of the memory unit may comprise receiving a request to update the physical status of the memory unit. In response to receiving the request to update the physical status of the memory unit, an entry in the table that is associated with the memory unit may be updated, the entry including physical information of the memory unit. A dirty flag associated with the entry may be set to a first value that indicates that the physical information of the memory unit associated with the entry has been updated.

Monitoring the physical status for the one or more memory units may comprise checking at least one of a threshold voltage setting, a health status or a validity status for each memory unit. Updating the entry in the table that is associated with the memory unit may comprise updating one or more bits included in the entry, the one or more bits representing at least one of a threshold voltage setting for the memory unit, a health status for the memory unit, a validity status for the memory unit, an encode type for content of the memory unit, a bit error rate for the memory unit, or one of an erase, program, or read count for the memory unit.

The non-volatile memory may include one of a NAND flash memory, NOR flash memory, or phase change memory (PCM). The cache memory may include one of a static random access memory (SRAM), dynamic random access memory (DRAM) or resistive random access memory (RRAM).

A memory unit may include one of a memory block, a memory page or a memory sub-page.

Implementations of the above techniques include methods, systems, computer program products and computer-readable media. One such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above described actions.

In the manner described above, a device controller in a memory device can efficiently manage the physical information of memory units, e.g., memory pages, sub-pages or memory blocks, in the memory device. By storing the entire physical information in the non-volatile memory, caching partial physical information in the cache and swapping the physical information in and out between the non-volatile memory and the cache on demand, the amount of physical information that is stored in the cache is limited and independent of the overall amount of physical information in the memory device. This is useful in memory devices with increasingly large memory block sizes, where the corresponding amount of physical information of the memory units is increasing. Since only a limited amount of the physical information is stored in the cache, the size of the cache is limited. This can help limit cost of the memory device, since the cache memory can be more expensive compared to the non-volatile memory.

The techniques can be applied to various types of non-volatile memory devices, such as NAND flash memory, NOR flash memory, or phase-change memory (PCM), among others. Additionally or alternatively, the techniques can be applied to various types of cache memory, such as static random access memory (SRAM), dynamic random access memory (DRAM), or resistive random access memory (RRAM), among others. In some implementations, additional tiers of caching are used, e.g., a third level cache that stores another portion of the physical information blocks.

The details of one or more disclosed implementations are set forth in the accompanying drawings and the description below. Other features, aspects, and advantages will become apparent from the description, the drawings and the claims.

DETAILED DESCRIPTION

Figure 1:
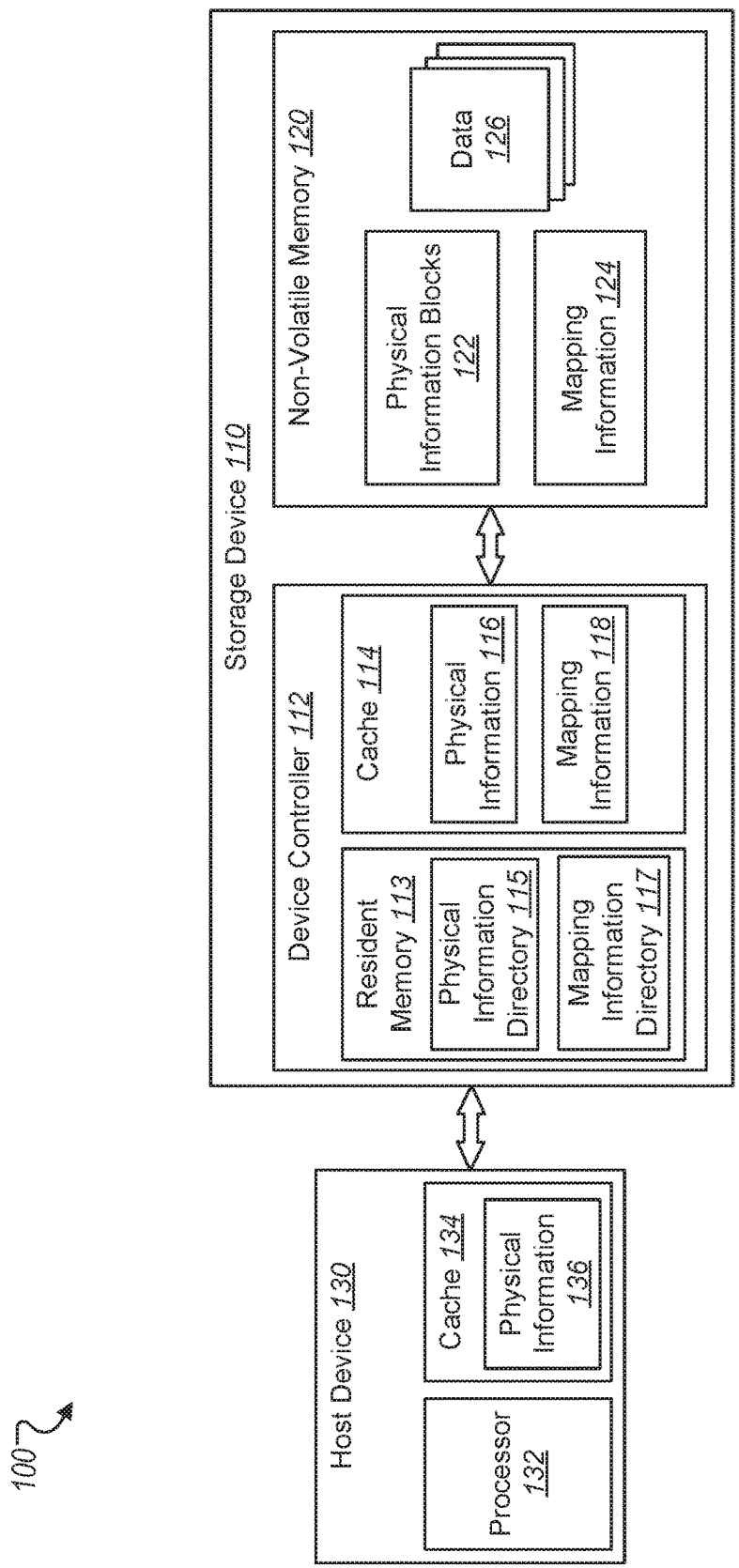
FIG. 1 illustrates an example of a system for using cache physical information tables, according to one or more implementations.

FIG. 1 illustrates an example of a system 100 for using cache physical information tables, according to one or more implementations. The system 100 includes a storage device 110 and a host device 130 that are coupled together. The storage device 110 includes a device controller 112 and a non-volatile memory 120. The device controller 112 includes a resident memory 113 and a cache memory 114. The resident memory 113 stores a physical information directory 115 and a mapping information directory 117. The cache memory 114 stores a physical information unit 116 and a mapping information unit 118. The non-volatile memory 120 stores physical information blocks 122, a mapping information unit 124 and data units 126. The host device 130 includes a processor 132. In some implementations, the host device 130 also includes a cache memory 134 that stores a physical information unit 136.

The device controller 112 is a microprocessor, or an application-specific microcontroller. In some implementations, the device controller 112 is a memory controller for the storage device 110. The following sections describe the various techniques based on implementations in which the device controller 112 is a memory controller. However, in some implementations, the device controller 112 is included in the host device 130, while the storage device 110 includes the non-volatile memory 120. In such cases, the device controller 112 is a host controller. The techniques described in the following sections are also applicable in such implementations, e.g., in which the device controller 112 is a host controller.

The processor 132 is configured to execute instructions and process data. The instructions and/or data are stored in the non-volatile memory 120, e.g., in the data units 126. In some implementations, the processor 120 is a microprocessor, or an application-specific microcontroller.

The non-volatile memory 120 is configured for long-term storage of instructions and/or data. In some implementations, the non-volatile memory 120 is a flash memory, e.g., a NAND flash memory device or a NOR flash memory device. In some implementations, the non-volatile memory 120 is some other non-volatile memory, e.g., a PCM device. In some implementations, the storage device 110 includes a plurality of non-volatile memory devices 120.

In some implementations, the data units 126 in the non-volatile memory 120 correspond to memory blocks, e.g., when the non-volatile memory 120 is a flash memory or a PCM device. In such cases, erase operations are performed at the granularity of a memory block, which is composed of multiple memory pages, also referred to simply as pages. As an example, in some implementations, the memory device 120 is a NAND flash memory device with a size in the order of 8 gigabytes (GB). The NAND flash memory device includes 2048 memory blocks. Each memory block includes 256 pages, where the size of a page is in the order of 16 kilobytes (kB).

A page is the granularity at which memory reads and writes are performed. A page includes a data area for storing data, and a small spare out-of-band area (OOB) that is used for storing metadata. In some implementations, depending on operations performed on a page or in other pages in the corresponding memory block, the physical condition of the page changes. The physical condition of the page is reflected in the physical information of the page, which is stored in a physical information block, as described below. The physical information of a page can include, for example, the number of times the page has been erased (erase count); error correction code (ECC) information used to check data correctness; health status of the page; a validity status of the page; and a threshold voltage setting for the page. In some implementations, the validity status of a page can be in one of two different states, for example, valid and invalid. In such cases, when data is written to a page, the state of the page is changed to valid. When data in a page is out of date or corrupted, the state of the page is invalid. However, in some other implementations, the validity status of a page can be in one of three different states. In such cases, in addition to the valid and invalid states noted above, the page also can be in a free/erased state. When no data has been written to a page, it is in the erased state. When a write is done to an erased page, the state of the page changes to valid.

In some implementations, the physical information for all memory units in the non-volatile memory 120 are collectively stored in the physical information blocks 122. In some implementations, the physical information blocks 122 are memory blocks that include pages storing physical information about the data units 126. In this context, a memory unit is a suitable portion of the memory device 120. For example, the memory unit can be a page, a sub-page (e.g., a word) or a memory block. The following sections describe techniques for implementations in which a memory unit is considered at the granularity of a page. However, the techniques are also applicable in implementations where the memory unit is a memory block or a sub-page, or another suitable portion of the memory device 120.

A page in a physical information 122 includes multiple entries, with each entry providing physical information for a page of a data unit 126. In some implementations, an entry identifies the associated data unit page and includes a byte of information about the physical status of the associated page. For example, the byte entry for a page provides physical information for the associated page as shown in Table I.

TABLE 1

| Bit 7 | Bit 6 | Bit 5 | Bit 4 | Bit 3 | Bit 2 | Bit 1 | Bit 0 |
|---|---|---|---|---|---|---|---|
| Threshold voltage (Vth) setting | | Health status/error correction code | | | Valid/invalid | | |

In some implementations, the physical information blocks 122 are segmented into portions, which are referred to as chunks. In such cases, physical information are transferred between the physical information blocks 122 and the cache 114 at the granularity of chunks. In some implementations, the physical information included in a chunk corresponds to a memory block of the non-volatile memory 120. For example, in some implementations, the memory device 120 includes 2048 memory blocks, with each block including 256 pages. The overall size of the physical information blocks 122, which include 1-byte entry for each data page, is 2048*256*1 byte=524 kB. A chunk corresponding to the memory block includes 256-byte entries for the 256 pages. Accordingly, in such cases the physical information blocks 122 include 2048 chunks, with each chunk being 256 bytes in size.

In some implementations, a chunk represents a different portion of the physical information blocks 122, such that the physical information in the chunk corresponds to a different section of the non-volatile memory 120, e.g., a page or a sub-page. As an example, in some implementations, each chunk has size in the order of 1 kilobyte (kB), 2 kB, or some other suitable size.

The mapping information unit 124 stores information mapping logical memory addresses, e.g., memory addresses that are accessed by the host device 130, to physical memory addresses, e.g., addresses of physical memory locations in the non-volatile memory 120 that stores the data units 126. The mapping information unit 124 can be any suitable data structure, e.g., a table or an array, among others. As described in greater detail in the following sections, an entry in the global directory includes an identifier for a physical information block 122 and a location (e.g., a physical memory address) in the non-volatile memory 120 where the physical information block is stored. Additionally or alternatively, in some implementations, the location where the physical information block is stored is a location in the cache 114, or the cache 134.

In some implementations, the device controller is a flash memory controller, e.g., where the non-volatile memory 120 is a flash memory device. The device controller 112 is configured to load portions of program instruction code or data, which are accessed by the processor 132, from the non-volatile memory 120 to the cache memory 114. The device controller 112 is also configured to load chunks of the physical information blocks 122 into the cache 114, e.g., into the physical information unit 116. The device controller 112 uses information stored in the resident memory 113, e.g., the physical information directory 115 and/or the mapping information directory 117, to load chunks of the physical information blocks 122 into the physical information unit 116, as described below.

In some implementations, the cache memory 114 includes one of SRAM, DRAM or RRAM, among other RAM memory devices, which is faster than the non-volatile memory 120, but is smaller in size compared to the non-volatile memory 120. The capacity of the cache memory 114 is insufficient to hold all the physical information blocks for all the memory units of the non-volatile memory 120, in addition to the program instruction code and/or data stored in the cache memory. The physical information unit 116 in the cache memory accordingly stores a subset of the physical information blocks 122. For example, a cache physical information table in the physical information unit 116 stores a number of chunks that represents a subset of the total number the physical information blocks 122. Considering the example noted above, in some implementations, the total size of the physical information blocks 122 is 524 kB, divided into 2048 chunks. The cache physical information table in the physical information unit 116 stores, at an instant in time, 64 chunks of the total 2048 chunks.

In some implementations, the physical information directory 115 and the mapping information directory 117 in the resident memory 113 forms a flash translation layer (FTL), e.g., which maps logical memory addresses for program instruction code and/or data accessed by the host device 130 to physical addresses of the data units 126 on the non-volatile memory device 120

In some implementations, when access to a logical address is performed, e.g. a read or write request by the host device 130, the device controller checks the mapping information unit 118 to determine the corresponding physical address in the non-volatile memory 120. The mapping information unit 118 caches a subset of the logical address to physical address mappings, while the mapping information unit 124 stores a complete logical address to physical address mapping. If an entry is found in the mapping information unit 118 for the requested logical address, then the device controller 112 obtains the corresponding physical address from the entry. On the other hand, if no entry is found in the mapping information unit 118 for the requested logical address, then the device controller 112 looks up the mapping information directory 117 in the resident memory to load the entry from the mapping information unit 124 into the mapping information unit 118 in the cache 114.

Based on the physical address that is obtained from the entry, the device controller 112 looks up physical information for the data unit corresponding to the physical address. The device controller 112 first checks whether the physical information is present in the physical information unit 116 in the cache 114, and reads the physical information from the physical information unit 116 if present. On the other hand, if the device controller 112 determines that the physical information is not present in the physical information unit 116 in the cache 114, then the device controller 112 looks up in the physical information directory to determine a location in the non-volatile memory 120 where the target physical information block 122 is stored. The device controller 112 loads the target physical information block 122 from the non-volatile memory 120 to the physical information unit 116 in the cache memory, and subsequently accesses the physical information from the target physical information block 122 loaded into the physical information unit 116.

In the above manner, the physical information directory 115, or the mapping information directory 117, or both, act as global directories. The physical information directory 115 and/or the mapping information directory 117 are maintained as a suitable data structures, e.g., a table or an array, among others. As described in greater detail in the following sections, an entry in the physical information directory 115 includes an identifier for a physical information block and a physical memory address in the non-volatile memory 120 where the physical information block is stored.

In some implementations, the entries in the mapping information unit 118 are a subset of the entries in the mapping information unit 124. In some implementations, the entries in the mapping information unit 118 replicate the entries in the mapping information unit 124. Similarly, in some implementations, the entries in the physical information unit 116 are a subset of the physical information blocks 122. In some implementations, the entries in the physical information unit 116 replicate all the physical information blocks 122.

In some implementations, a subset of the physical information blocks 122 is maintained in the cache memory 134 in the host device 130, in addition, or as an alternative, to storage in the physical information unit 116. In such implementations, for example, the physical information unit 136 stores a subset of the chunks corresponding to the physical information blocks 122. The device controller 112 is also configured to manage the physical information chunks stored in the physical information unit 136, in addition to managing physical information chunks stored in the physical information unit 116.

In some implementations, the operations performed by the device controller can vary, depending on whether a read or a write request from the host device 130 is serviced, or whether the device controller 112 performs garbage collection. For example, in some implementations, the device controller 112 receives a read request from the host device 130. The device controller 112 performs a logical to physical address lookup to determine a physical address that corresponds to the logical address indicated in the request from the host device 130. The device controller 112 first checks whether the logical to physical address mapping is present in the mapping information unit 118 in the cache memory 114. If present, the device controller 112 reads the physical address corresponding to the logical address from the mapping information unit 118.

On the other hand, if the logical to physical address mapping is not present in the mapping information unit 118, then the device controller 112 looks up in the mapping information directory 117 to determine the location of the logical to physical address mapping in the mapping information unit 124 in the non-volatile memory 120. Upon determining the location, the device controller 112 loads the logical to physical address mapping from the mapping information unit 124 to the mapping information unit 118, and then reads the physical address corresponding to the logical address from the mapping information unit 118.

Using the physical address read in the above manner, the device controller 112 looks up the corresponding physical information for the memory unit. In some implementations, the physical information is obtained from the physical information unit 116 in the cache 114. In some other implementations, the physical information is obtained by looking up the location in the physical information blocks 112 based on entries in the physical information directory 115, and loading a corresponding physical information block 122 into the physical information unit 116. In some implementations, the device controller 112 obtains one or more of a threshold voltage (Vth) setting or an error correcting code (ECC) setting for the memory unit from the physical information. The device controller 112 reads the requested data based on accessing the memory unit using the physical address, performing the read operation using the threshold voltage level, and upon applying the ECC setting to the content stored in the memory unit.

As another example, in some implementations, the device controller 112 receives a write request from the host device 130. Upon receiving the write request, the device controller 112 allocates a blank memory unit, e.g., a page, for the updated data that is to be written. Using the physical address of the blank memory unit, the device controller looks up the corresponding physical information, e.g., in a manner described above. In some implementations, by looking up the physical information, the device controller 112 obtains the ECC setting for the memory unit.

The device controller 112 programs the blank memory unit with the data to be written. Following writing the data, the device controller 112 updates the corresponding physical information for the memory unit to record as valid. The device controller 112 also looks up the original physical address corresponding to the logical address in the write request, e.g., using the mapping information 118 and/or the mapping information directory 117, as described previously. The device controller 112 obtains the physical information corresponding to the original physical address, and updates the physical information to mark the content of the original physical address as invalid. The device controller 112 also updates the entry in the mapping information unit 118 to map the physical address of the newly programmed memory unit to the logical address indicated in the write request. A similar update is made to the entry in the mapping information unit 124 to map the physical address of the newly programmed memory unit to the logical address indicated in the write request.

As another example, in some implementations, the device controller 112 performs garbage collection. In such cases, the device controller 112 selects a memory unit that is to be garbage collected. Based on the physical address of the selected memory unit, the device controller 112 looks up the physical information corresponding to the memory unit. In some implementations, the device controller 112 learns the threshold voltage (Vth) setting or the ECC setting for the memory unit from the physical information, and/or determines the validity status of the data content of the memory unit based on the physical information.

The device controller 112 allocates a blank memory unit in the non-volatile memory 120 in which to write the data content of the selected memory unit as part of the garbage collection process. Using the physical address of the blank memory unit, the device controller looks up the corresponding physical information, e.g., in a manner described above. In some implementations, by looking up the physical information, the device controller 112 obtains the ECC setting for the memory unit.

The device controller 112 reads the valid data from the selected memory unit, and writes the data to the blank memory unit. Following transferring the valid data to the blank memory unit, the device controller 112 updates the physical information corresponding to the selected memory unit to mark the content of the original physical address as invalid. The device controller 112 also updates the entry in the mapping information unit 118 to map the physical address of the newly programmed memory unit to the logical address that was previously associated with the memory unit selected for the garbage collection. A similar update is made to the entry in the mapping information unit 124 to map the physical address of the newly programmed memory unit to the logical address previously associated with the selected memory unit.

Figure 2:
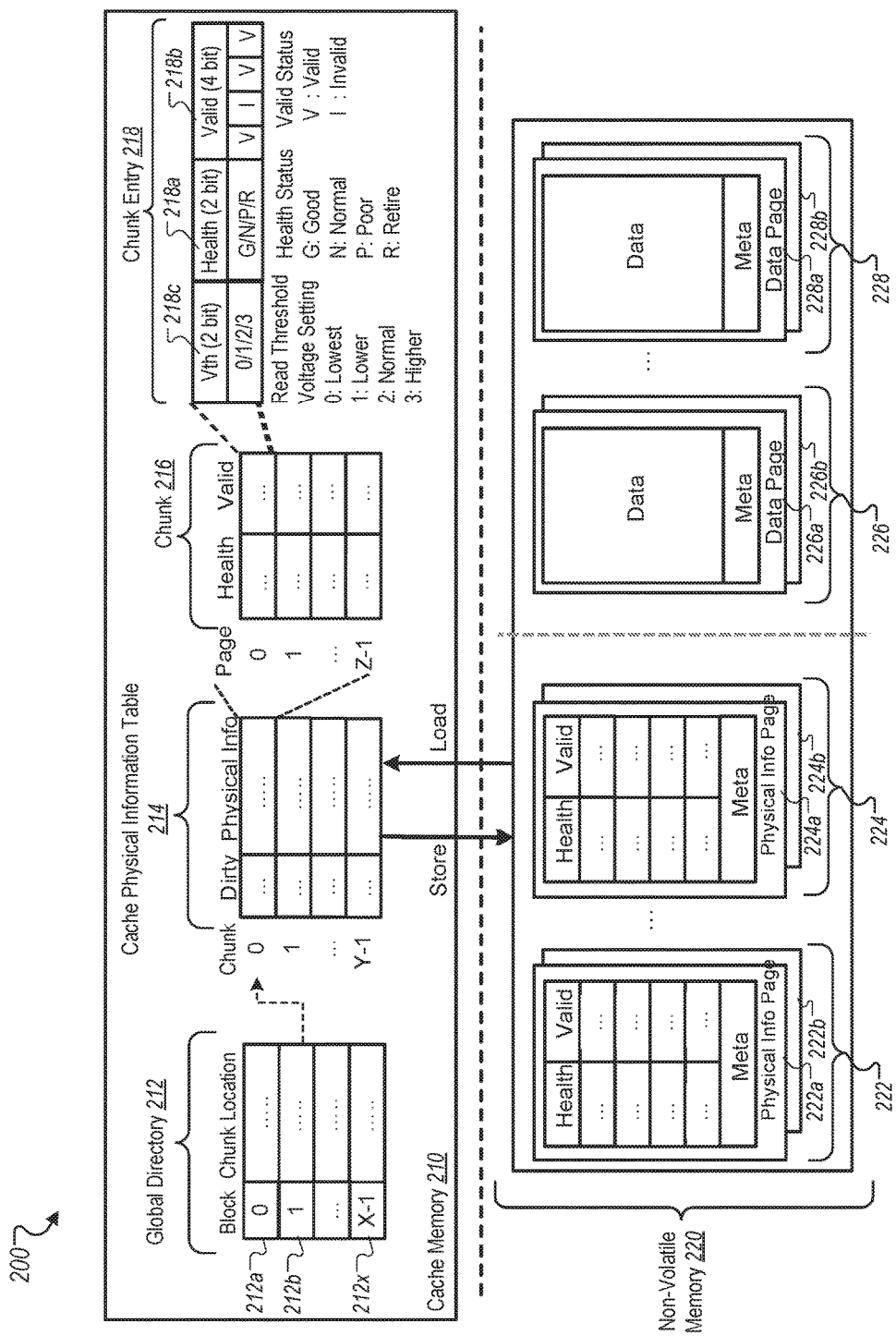
FIG. 2 illustrates an example organization for managing physical information of memory units between a cache memory and a non-volatile memory, according to one or more implementations.

FIG. 2 illustrates an example organization 200 for managing physical information of memory units between a cache memory 210 and a non-volatile memory 220, according to one or more implementations. In some implementations, the cache memory 210 is similar to the cache memory 114 and the non-volatile memory 220 is similar to the non-volatile memory 120.

The cache memory 210 includes a global directory 212 and a cache physical information table 214. The cache physical information table 214 stores multiple chunks, including, e.g., chunk 216. Each chunk includes multiple entries, e.g., chunk entry 218.

The non-volatile memory 220 stores multiple physical information blocks, e.g., physical information blocks 222 and 224, and multiple data blocks, e.g., data blocks 226 and 228. Each physical information block stores multiple physical information pages, e.g., physical information pages 222a and 222b stored in physical information block 222, and physical information pages 224a and 224b stored in physical information block 224. Each data block stores multiple data pages, e.g., data pages 222a and 222b stored in data block 222, and data pages 224a and 224b stored in data block 224.

As shown, each physical information page, e.g., 222a, 222b, 224a and 224b, has multiple entries, with each entry providing physical status information (e.g., one or more of threshold voltage setting, health status, or validity status) for a data page. Each data page, e.g., 226a, 226b, 228a and 228b, includes a data portion for storing content (e.g., program instruction code and/or data) and a metadata portion that stores, among others, physical information about the page.

In some implementations, the global directory 212 is similar to the physical information directory 115 described previously. The device controller, e.g., device controller 112, uses the global directory 212 to index the locations of chunks corresponding to the physical information blocks, e.g., physical information blocks 222 and 224.

In this context, a physical information block is a memory block in the non-volatile memory 220 that includes physical information pages, such as physical information pages 222a, 222b, 224a and 224b. A data block is a memory block of the non-volatile memory 220 that stores data pages, such as data pages 226a, 226b, 228a and 228b. As shown by the entries in the global directory 212, the non-volatile memory 220 includes X (X is an integer >0) physical information blocks 0, 1, . . . up to X−1.

The global directory 212 includes X entries that indicate locations of the physical information blocks, or the chunks that include physical information blocks, in the non-volatile memory 220. For example, entry 212a in the global directory 212 provides information about the location of a chunk corresponding to physical information block 0; entry 212b in the global directory 212 provides information about the location of a chunk corresponding to physical information block 1; and entry 212x in the global directory 212 provides information about the location of a chunk corresponding to physical information block X−1.

FIG. 2 shows implementations in which the global directory 212 is stored only in the cache memory 210. However, in some implementations, a copy of the global directory is also stored in the non-volatile memory 220. Additionally or alternatively, in some implementations, a portion of the global directory is stored in the cache memory 210 and a remaining portion of the global directory is stored in the non-volatile memory 220. In some implementations, the global directory 212 is stored only in the non-volatile memory 220. In such cases, the device controller 112 accesses the global directory from its location in the non-volatile memory 220.

In some implementations, the cache physical information table 214 is similar to the cache physical information table in the physical information unit 116. The cache physical information table 214 stores a subset of chunks that correspond to a portion of physical information blocks stored in the non-volatile memory 220. For example, the non-volatile memory 220 includes X physical information blocks, e.g., physical information blocks 222 and 224. The cache physical information table 214 stores Y chunks (where Y is an integer, 0<Y<X) 0, 1, . . . , up to Y−1, which include copies of physical information stored in a subset of the X physical information blocks. For example, as shown in FIG. 2, the cache physical information table 214 includes an entry for chunk 216.

Each chunk corresponds to one or more physical information blocks, e.g., one or more of physical information blocks 222 and 224. As shown in FIG. 2, each chunk stores entries for Z (where Z is an integer >0) physical information pages, e.g., one or more physical information pages 222a, 222b, 224a and 224b, (in this implementation example, a memory unit refers to a page).

Each chunk entry, e.g., physical information page, in a chunk includes a number of bits that provides the physical status about the corresponding data page. In some implementations, the physical status information in a chunk entry includes health status of the corresponding page and validity of the information in the page. For example, as described previously, in some implementations, each chunk entry is 1 byte. Chunk entry 218 shown in FIG. 2, which is one of the entries in the chunk 216, indicates the physical information provided by the bits of the chunk entry byte. Two bits, e.g., bits 5 and 4, represented by 218a, provide information on the health status of the corresponding page. As shown, the health status information in the two bits 218a can indicate G/N/P/R, which correspond to information that the page is in good health, normal health, poor health, or that the page should be retired, respectively. Different values of the two bits 218a represent different health status.

In this context, the health status indicates a type of error correction code (ECC) that is used to maintain the data in the page. For example, a good health status means that bit error rate (BER) for the page is low. In such cases, the device controller can use an ECC that is suitable for low BER, e.g., Bose, Chaudhuri, and Hocquenghem (BCH) code. A normal health status means that BER is in a middle range. In such cases, the device controller can use an ECC that is suitable for middle-range BER, e.g., a low-density parity-check (LDPC) code. A poor health status means that the BER for the page is high. In such cases, the device controller can use an ECC that is suitable for middle-range BER, e.g., a suitable redundant array of independent disks (RAID) code. A retire health status means that the BER for the page is greater than a preselected high threshold. In such cases, the page should not be used further for storing data. The device controller can retire the page, e.g., by programming the page with dummy data.

In some implementations, the BER thresholds for the different health status conditions are preselected and programmed as part of manufacture of the memory device. For example, a non-volatile memory chip manufacturer can include an ECC circuit in the storage device (e.g., storage device 110) to handle error bits in memory pages. In some implementations, the ECC circuit is configured to provide up to 40-bit error correction for every 1 kB of data. In such cases, BER<20 bits/1 kB can be set to low BER (indicating good health status); BER<30 bits/1 kB can be set to middle-range BER (indicating normal health status); BER<40 bits/1 kB can be set to high BER (indicating poor health status); and BER>40 bits/1 kB indicates that the page should be retired.

By checking the health status of the pages as described above, the device controller can dynamically change the ECC applied to the pages as needed. The health status of a page (or a memory block, as the case may be) can change with time, e.g., a page becomes progressively weaker after multiple erase/program cycles. For example, the BER for a page may be 2 bits/1 kB after 10 erase/program cycles, but the BER can increase to 20 bits/1 kB after 2000 erase/program cycles. The device controller updates the health status when accessing the physical information for the page as part of reading the page data (e.g., when garbage collection is performed), and can accordingly adapt to the error protection level when the data is next written to the page.

Four bits of the chunk entry 218, e.g., bits 3, 2, 1 and 0, represented by 218b in FIG. 2, indicate validity status of the corresponding page. As shown, bits 3, 1 and 0 are set to a bit value V, indicating that the page is valid. Bit 2 is set to a bit value denoted as I, indicating that the page is invalid. In some implementations, V=1 and I=0; in other implementations, V=0 and I=1. In this context, the validity status of the bits represented by 218b indicates whether the data in the page is valid or not in the physical space, e.g., in the copy stored in the non-volatile memory 220. Once the content of a data page is updated in the logical space, e.g., in the copy of the data page in the cache memory 210, then the validity status in the corresponding physical information page is updated to indicate that the content of the data page in the physical space is invalid. In such cases, before removing the copy of the data page from the cache memory, the device controller writes the updated content to a new copy of the data page in the non-volatile memory 220, and invalidates the previously stored copy in the non-volatile memory. The device controller refer to this validity status in the physical information page to store valid content in the corresponding data page in the non-volatile memory 220 before erasing from the cache memory 210.

The remaining two bits, e.g., bits 7 and 6, represented by 218c, provide information on the read threshold voltage (Vth) setting of the corresponding page. As shown, the threshold voltage (Vth) setting information in the two bits can indicate one of values 0, 1, 2 or 3, which correspond to: a lowest level of read threshold voltage, a lower-than-normal level of read threshold voltage, a normal level of read threshold voltage, or a higher-than-normal level of read threshold voltage, respectively. Different values of the two bits 218c represent different threshold voltage levels.

In this context, the threshold voltage (Vth) setting 218c indicates the voltage that the device controller has to apply to a memory page to read the content of the page. When a memory page is programmed, the threshold voltage is initially set to a default value, e.g., level 2 (normal), in the corresponding physical information page. The current value is reset after performing a block erase operation, in which all memory pages in a memory block are erased together.

In some cases, the actual threshold voltage that is to be applied to a memory page during a read operation can change from the default value programmed in the physical information page. For example, the normal Vth level can become incorrect, e.g., too high, due to retention issues, which is a function of the age of the data programmed into the memory page (e.g. one or more programmed bits can flip due to the voltage applied, leading to incorrect readings). In such cases, the Vth setting is updated from level 2 (normal) to level 1 (lower) or even level 0 (lowest). Accordingly, in some implementations, the device controller updates the Vth setting from level 2 to level 1 or level 0 in the two-bit Vth field 218c of the chunk entry 218.

Additionally or alternatively, after multiple reads of the memory page, the default Vth value (level 2 or normal) in the field 218c can become incorrect, e.g., too low, due to read disturbance. Reading the memory page using the default value can lead to bit errors. In such cases, the device controller updates the Vth setting from level 2 (normal) to level 3 (higher) in the two-bit Vth field 218c. The device controller accordingly reads the memory page using the higher Vth level, for a lower bit error rate.

Additionally or alternatively, after programming the current, or a neighboring, word line, the default Vth value (level 2 or normal) in the field 218c can become incorrect, e.g., due to program disturbance. Reading the memory page using the default value can lead to bit errors. In such cases, the device controller updates the Vth setting from level 2 (normal) to a different level in the two-bit Vth field 218c, e.g., by referring to the Program Order table shown in Table 2. The device controller subsequently reads the memory page using the updated Vth level indicated in field 218c, for a lower bit error rate.

TABLE 2

| Program Order | | |
|---|---|---|
| Word Line | LSB Page | MSB Page |
| 0 | 0 | 2 |
| 1 | 1 | 4 |
| 2 | 3 | 6 |
| ... | ... | ... |
| 126 | 251 | 254 |
| 127 | 253 | 255 |

In Table 2, LSB: least significant bit and MSB: most significant bit.

By checking the threshold voltage (Vth) setting of the pages as described above, the device controller can dynamically change the threshold voltage that is applied to the pages during read operations as needed. As noted above, the threshold voltage of a page can change with time or due to repeated program operations. The device controller updates the Vth setting when accessing the physical information for the page as part of reading the page data, programming word lines, or based on page age, and can accordingly adapt to the accurate Vth level when the data is next read from the page.

The information in the chunk entry 218 also represents the information in each entry of a physical information page in a physical information block in the non-volatile memory 220. For example, the bits representing the threshold voltage setting, health status or validity status information in the chunk entry 218 are similar to the bits representing the threshold voltage setting, health status or validity status information in each entry of the physical information page 222a, 222b, 224a or 224b.

In some implementations, the physical status in a chunk entry includes other information, apart from threshold voltage setting, health status or validity status. For example, the physical information in a chunk entry can include one or more of erase, program, or read counts for the page, which indicate a number of times the page has been erased, programmed, or read, respectively.

As described above, in some implementations, the physical information of a data page changes after the data page is loaded into the cache memory 210, e.g., for a read or write operation. For example, the device controller (e.g., device controller 112), upon accessing a page, determines that the threshold voltage setting, health status, or validity of the data page has changed from the physical information indicated by the corresponding chunk entry stored in the cache physical information table 214. In such cases, the device controller 214 updates the physical information in the corresponding chunk entry. The device controller also marks the associated chunk that includes the update chunk entry as dirty in the cache physical information table 214.

In some implementations, each individual entry in a chunk in the cache physical information table 214 has an associated dirty flag, e.g., a bit whose value indicates whether physical information in the associated physical information page in the chunk has changed, since the time the chunk was loaded into the cache physical information table 214 from the non-volatile memory 220.

In some implementations, a chunk includes an overall dirty flag. When physical information in a physical information page is updated, the device controller sets the dirty flag (e.g., sets the bit to a value of 1 in some implementations and to a value of 0 in other implementations) for the chunk that includes the physical information page, to indicate that the chunk includes at least one chunk entry (e.g., a physical information page) that has been updated.

The dirty flag for a chunk in the cache physical information table 214 indicates that the physical information content of the chunk in the cache physical information table 214 is different compared to the physical information content of the corresponding physical information blocks stored in the non-volatile memory 220. As described in greater detail below, when a chunk is removed from the cache physical information table 214, e.g., to make space available to load a different chunk, the device controller writes back the physical information in the chunk to a physical information block in the non-volatile memory 220 if the dirty flag is set for the chunk.

In some implementations, when a request is received, e.g., from the host device 130, to access data in a data page, the device controller, e.g., device controller 112, uses the mapping information directory 117 to perform address translation for locating the data page (e.g., in a data block) in the non-volatile memory 220 or the cache memory 210 to service the request. As part of servicing the request, the device controller accesses the associated physical information page to determine the threshold voltage setting of the page, the health status of the page and/or whether the information in the page is valid. The device controller first checks in the cache physical information table 214 whether the target physical information page associated with the requested data page is present as an entry in a chunk in the cache physical information table 214. If the target physical information page is present in a chunk in the cache physical information table 214, the physical information is directly accessed from the chunk entry in the cache physical information table 214.

On the other hand, if the target physical information is not present in the cache physical information table 214, the device controller looks up the entries in the global directory 212 to determine the location, in non-volatile memory 220, of the chunk or the physical information block that stores the associated physical information page. Upon determining the location in the non-volatile memory 220 from the global directory 212, the device controller loads a chunk corresponding to the physical information block that includes the target physical information page to a location in the cache physical information table 214. For example, in some implementations, the physical information for the request page is included in physical information block 224. By looking up the entry for physical information block 224 in the global directory 212, the device controller determines the location of the physical information block 224 in the non-volatile memory 220. The device controller accesses the physical information block 224 from its location in the non-volatile memory 220 indicated by the global directory 212, and loads a chunk that includes the physical information block 224 to an entry in the cache physical information table 214. The device controller then looks up the target physical information page from the chunk entries in the recently loaded chunk.

In some implementations, the device controller evicts an existing chunk from the cache physical information table 214 to make space available to load the new chunk from the non-volatile memory 220. This can be the case, for example, when the cache physical information table 214 is full. The device controller uses a suitable eviction strategy to select an existing chunk for eviction. For example, the device controller can use one of a Least Recently Used (LRU) strategy, or a segmented LRU array cache strategy, among others, to select a chunk for eviction from the cache physical information table 214.

If the chunk chosen for eviction has not been updated since the time it was loaded into the cache physical information table 214, e.g., the dirty flag for the chunk is not set, then the chunk is simply replaced with the new chunk without further operations. On the other hand, if the dirty flag for the chunk being evicted is set, indicating that at least one chunk entry includes updated physical information since the chunk was loaded into the cache physical information table 214, then the physical information in the chunk is written back to the non-volatile memory 220 before being replaced with the new chunk.

The device controller writes the physical information in the chunk to the corresponding physical information block in the non-volatile memory 220. In some implementations, the device controller creates a new copy of the physical information at a new location in the non-volatile memory 220 and writes the chunk content into the new physical information. The device controller then updates the entry in the global directory 212 for the physical information block to point to the location in the non-volatile memory 220.

Following these operations, a chunk corresponding to the physical information block that includes the target physical information page is loaded into the cache physical information table 214 and stored in the entry that was previously occupied by the evicted chunk.

Figure 3:
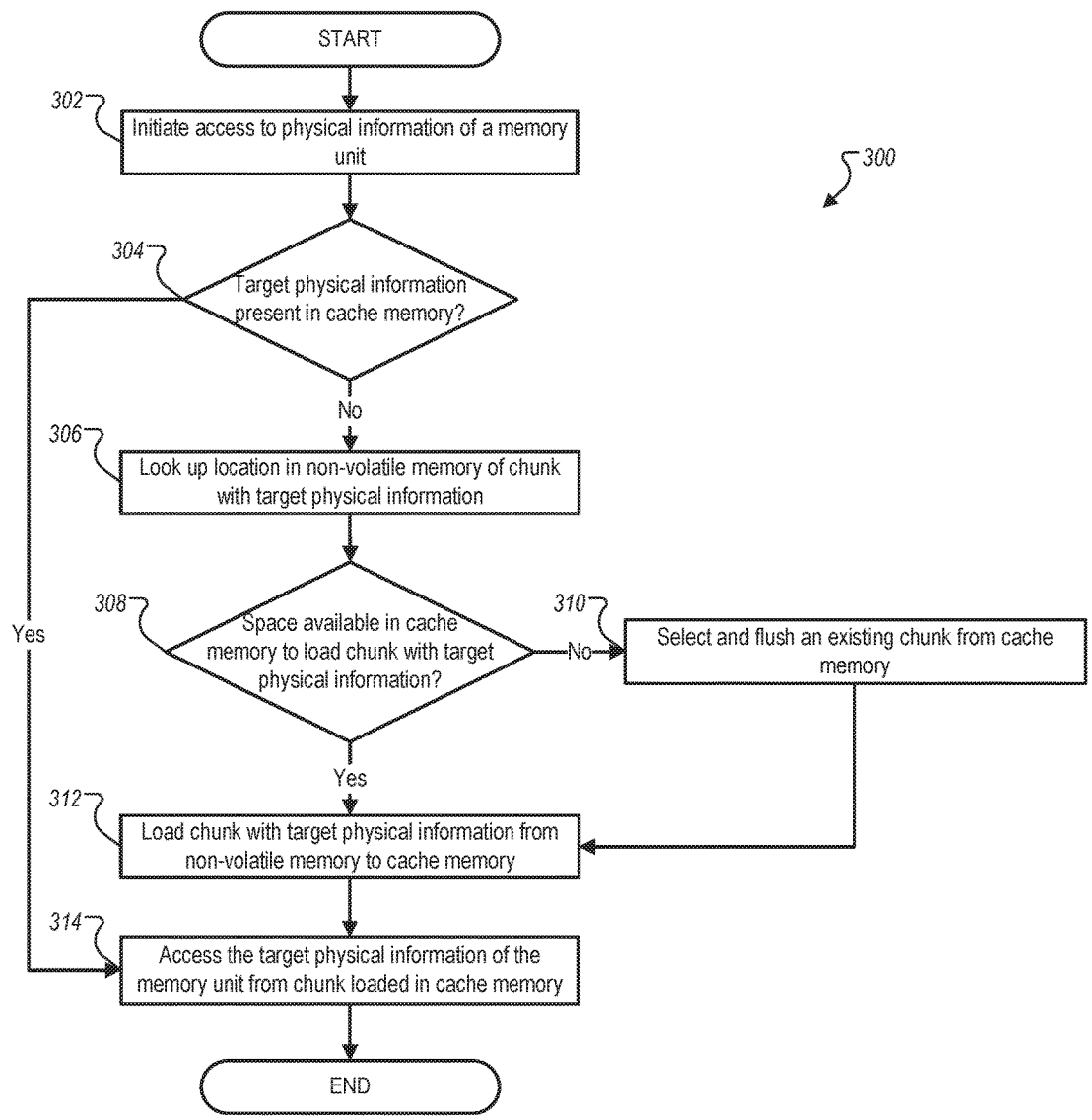
FIG. 3 illustrates an example of a process to look up physical information of a memory unit in a memory device, according to one or more implementations.

FIG. 3 illustrates an example of a process 300 to look up physical information of a memory unit in a memory device, according to one or more implementations. In some implementations, the process 300 is performed by a device controller, e.g. device controller 112, to transfer chunks that correspond to the physical information blocks 122 between the non-volatile memory 120 and the physical information unit 116 in the cache memory 114 (or equivalently, to transfer chunks corresponding to physical information blocks 222 or 226 between the non-volatile memory 220 and the cache physical information table 214 in the cache memory 210). Accordingly, the following sections describe the process 300 with respect to the device controller 112 and the system 100. However, in other implementations, the process 300 may be performed by other devices or systems.

The process 300 starts at 302, when an access to physical information of a memory unit is initiated. For example, in some implementations, the device controller 112 performs garbage collection in a memory block, such as one of memory blocks 226 or 228, and accesses one or more data pages in the corresponding memory block, such as data pages 226a and 226b, or 228a and 228b, to check their validity to migrate data before erasing the memory bock. In some other implementations, the device controller 112 receives a request from the host device 130 to access a data page (e.g., to read to or write from the page). In either case, the device controller 112 accesses the physical information of the data page, e.g., to determine the threshold voltage setting, the health status and/or the validity status for the page. Accordingly, the device controller initiates access to a target physical information page that includes the physical information for the requested data page, e.g., one of physical information pages 222a, 222b, 224a or 224b.

At 304, a determination is made whether the target physical information is present in the cache memory. For example, the device controller 112 checks a cache physical information table in the cache memory, e.g., the cache physical information table 214 in the cache memory 210, to determine whether the chunk that includes an entry corresponding to the target physical information page is present in the cache physical information table.

If a determination is made at 304 that the target physical information is not present in the cache memory, then, at 306, a location in non-volatile memory of the chunk with the target physical information is looked up. For example, if the device controller 112 determines that a chunk with the target physical information page is not present in the cache physical information table 214, then the device controller accesses the global directory 212. By checking the entries in the global directory 212, e.g., entries 212a, 212b, or 212x, the device controller 112 determines the physical information block that includes the target physical information page, and location of the physical information block, or a chunk of the physical information block that includes the target physical information page, in the non-volatile memory 220.

At 308, a determination is made whether space is available in the cache memory to load the chunk with the target physical information. For example, upon determining the location, in the non-volatile memory 220, of the physical information block, or a chunk of the physical information block, that includes the target physical information page, by performing a lookup of the global directory 212, the device controller 112 proceeds to load the chunk into the cache physical information table 214.

To load the chunk into the cache physical information table 214, the device controller 112 checks whether there is any space available in the cache physical information table 214 to load the chunk. If the cache physical information table 214 is full, the device controller 112 checks the dirty flags of the active chunks present in the cache physical information table to determine if any active chunk is clean. If any active chunk is clean, then the device controller 112 can simply replace the clean chunk by loading, into the space occupied by the clean chunk, the new chunk with the target physical information page.

If a determination is made at 308 that space is not available in the cache memory to load the chunk with the target physical information, then at 310 an existing chunk is selected and flushed from cache memory. For example, in some implementations the device controller 112 determines that no active chunks, e.g., chunks in the cache physical information table 214, are clean, e.g., the dirty flags of all the chunks are set. In such cases, the device controller 112 selects one of the active chunks for eviction using a suitable eviction strategy. In some implementations, the selected chunk is dirty, e.g., the physical information of one or more entries in the chunk have been updated since the chunk was loaded into the cache memory. Accordingly, before replacing the selected chunk with the chunk to be loaded from non-volatile memory, the device controller 112 writes back the physical information in the selected dirty chunk to the non-volatile memory 220. In some implementations, several chunks can be updated, e.g., a 16 kB page can update 16 chunks if each chunk is 1 kB in size. In such cases, multiple chunks can be flushed from the cache memory to make space available.

As described previously, in some implementations, the device controller 112 selects a new location for the physical information page corresponding to the selected chunk in the non-volatile memory 220 and commits the information content of the selected chunk from the cache memory 210 into the new physical information page in the non-volatile memory 220. Then the device controller 112 updates the location for the corresponding physical information page in the global directory 212 to point to the new location of the physical information page in the non-volatile memory.

In some implementations, the device controller 112 looks up the location in the non-volatile memory 220 of the physical information block that includes the physical information page corresponding to the selected chunk by examining the entries in the global directory 212. Then the device controller 112 accesses the physical information page at the indicated location in the non-volatile memory 220, and overwrites the content of the physical information page with the information of the selected chunk from the cache memory 210.

Upon writing back the selected chunk from the cache memory to the non-volatile memory at 310, or if a determination is made at 308 that space is available in the cache memory, then at 312 the chunk with the target physical information is loaded from the non-volatile memory to the cache memory. For example, in some implementations the device controller determines at 308 that one or more active chunks in the cache physical information table 214 are clean. In such cases, the device controller selects a clean chunk for replacement with the chunk that is to be loaded from the non-volatile memory. Alternatively, following committing the physical information of a selected chunk into the non-volatile memory, the selected chunk can be replaced with the chunk to be loaded from the non-volatile memory. In either case, the device controller 112 loads the physical information block, or a chunk of the physical information block, that includes the target physical information page from the non-volatile memory into the selected space in the cache physical information table 214.

Following loading the chunk with the target physical information from the non-volatile memory to the cache memory at 312, or if a determination is made at 304 that the target physical information for the memory unit is present in the cache memory, then at 314, the target physical information of the memory unit is accessed from the chunk loaded in the cache memory. For example, in some implementations the device controller 112 determines, following the initial lookup of the cache physical information table 214 at 304, that the chunk that includes the target physical information page is present in the cache physical information table 214. In such cases, the device controller 112 obtains the physical information from the corresponding chunk entry in the cache physical information table 214 and determines one or more of the threshold voltage setting, the health status, or the validity status of the associated data page.

In some implementations, the physical information unit 136 in the host device 130 has a larger size than the physical information 116 in the cache memory. In such cases, the physical information unit 136 in the host device is used to cache additional physical information pages when there is not enough capacity in the physical information unit 116. If the device controller 112 determines, following the initial lookup of the cache physical information table 214 at 304, that the chunk that includes the target physical information page is not present in the physical information unit 116 (e.g., in the cache physical information table 214), and the non-volatile memory 120 is busy, then the device controller 112 checks if the chunk is available in the physical information unit 136. If the chunk is present in the physical information unit 136, then device controller 112 requests the chunk from the host device 130.

In other implementations, the device controller 112 loads the chunk that includes the target physical information page from the non-volatile memory 220 to the cache physical information table 214, as described with respect to 306-312. In such cases, following loading the chunk into the cache physical information table 214, the device controller 112 obtains the physical information from the chunk entry corresponding to the target physical information page in the cache physical information table 214 and determines one or more of the threshold voltage setting, the health status or the validity status of the associated data page. Additionally or alternatively, the device controller 112 sends the physical information to the host device 130 in response to a request for the information.

In the above manner, the device controller 112 can efficiently manage physical information of memory units by storing the entire physical information in the non-volatile memory while caching partial physical information in the cache memory, and swapping in/out between the cache memory and the non-volatile memory on demand. The device controller uses a cache physical information table in the cache memory, which is much smaller in size compared to the overall size of the physical information blocks present in the non-volatile memory, thereby limiting the amount of cache memory used to store the physical information of memory units. The device controller makes use of a global directory for transferring the physical information between chunks in the cache physical information table and physical information blocks in the non-volatile memory.

Figure 4:
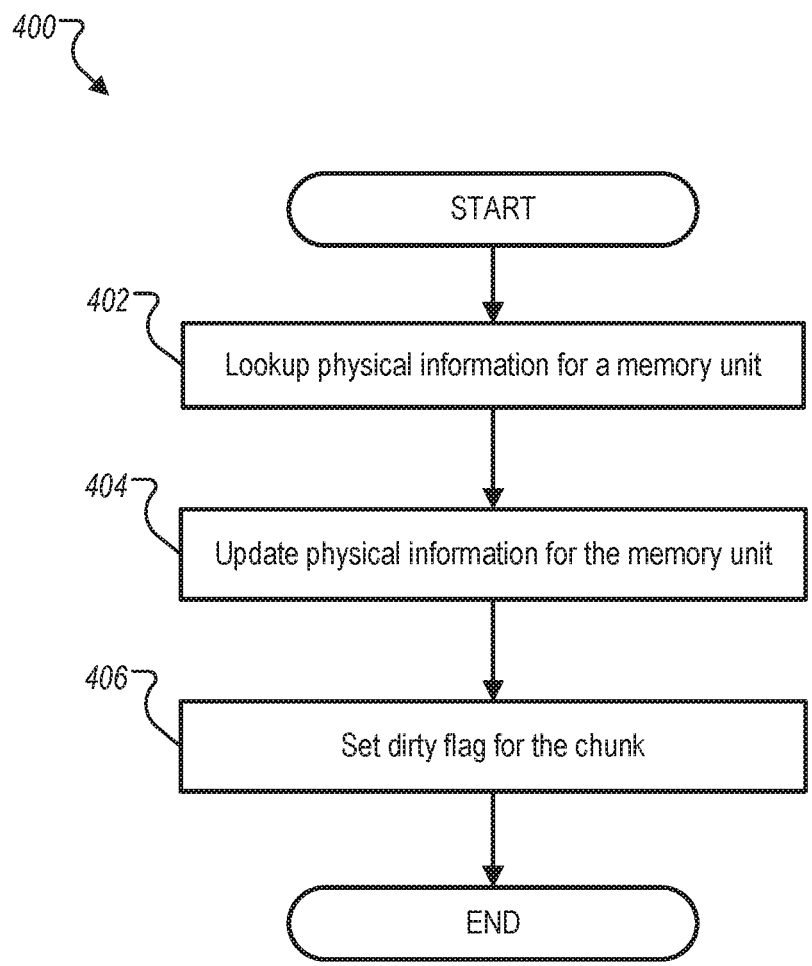
FIG. 4 illustrates an example of a process to update the physical information of a memory unit, according to one or more implementations.

FIG. 4 illustrates an example of a process 400 to update the physical information of a memory unit, according to one or more implementations. In some implementations, the process 400 is performed by the device controller 112 when accessing a memory unit, e.g., when accessing a data page. Accordingly, the following sections describe the process 400 with respect to the device controller 112 and the system 100. However, in other implementations, the process 400 may be performed by other devices or systems.

The process 400 starts at 402, when the physical information for a memory unit is looked up. For example, in some implementations, the device controller 112 performs garbage collection in a memory block, such as one of memory blocks 226 or 228, and accesses one or more data pages in the corresponding memory block, such as data pages 226a and 226b, or 228a and 228b, to check their validity to migrate data before erasing the memory bock. In some other implementations, the device controller 112 receives a request from the host device 130 to access a data page (e.g., to read to or write from the page). In either implementation, as part of accessing the data page in response to the request or garbage collection operation, the device controller 112 accesses the physical information for the page.

As described with respect to the process 300, in some implementations, the device controller accesses an entry in an active chunk in the cache physical information table 214 that holds the physical information page associated with the requested data page. In some other implementations, the device controller accesses the physical information after loading the corresponding physical information block, or a chunk of the physical information, from the non-volatile memory 220 into the cache physical information table 214. In such cases, the device controller determines that the physical information page associated with the requested data page is not present in the cache physical information table 214. The device controller performs a lookup of the global directory 212 to determine the location of the corresponding physical information block, or a chunk of the physical information in the non-volatile memory 220. Upon determining the location, the device controller loads the corresponding physical information block, or a chunk of the physical information, from the non-volatile memory 220 into the cache physical information table 214.

At 404, the physical information for the memory unit is updated. For example, upon reading from or writing to the data page, the device controller 112 determines that the physical information for the data page has changed. As described previously, in some implementations, the physical information includes the threshold voltage setting, the health status or validity status of the page. While performing the read or write operation, the device controller 112 can determine that the number of bit errors has changed such that the health status for the page has to be updated. Alternatively, upon writing new data into the page, the device controller 112 can determine that the validity status should be set to invalid to indicate that the page is dirty, and that the corresponding page data stored in the non-volatile memory is invalid, e.g., out of date. Accordingly, the device controller 112 updates the physical information for the page in the corresponding chunk entry (e.g., updates one or more of the bits as described with respect to chunk entry 218) in the associated active chunk in the cache physical information table 214.

At 406, the dirty flag for the chunk is set. For example, upon updating the chunk entry corresponding to the target data page in the associated active chunk in the cache physical information table 214, the device controller 112 sets the flag bit for the chunk to indicate that the chunk is dirty, e.g., one or more chunk entries in the chunk include updated physical information. Accordingly, when removing the chunk from the cache physical information table 214, the information in the chunk is written back to the non-volatile memory, as described with respect to process 300, and also in the following sections.

Figure 5:
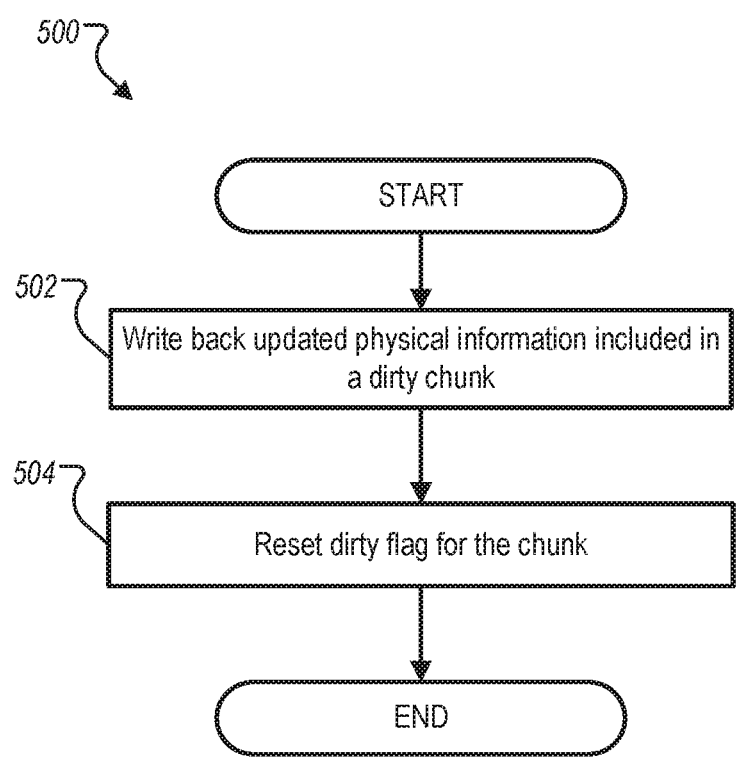
FIG. 5 illustrates an example of a process to flush a dirty chunk from a cache physical information table, according to one or more implementations.

FIG. 5 illustrates an example of a process 500 to flush a dirty chunk from a cache physical information table, according to one or more implementations. In some implementations, the process 500 is performed by the device controller 112 when making space available in the cache physical information table 214 to load a chunk from the non-volatile memory 220, e.g., as described with respect to 310 in the process 300. Accordingly, the following sections describe the process 500 with respect to the device controller 112 and the system 100. However, in other implementations, the process 500 may be performed by other devices or systems.

The process 500 starts at 502, when updated physical information included in a dirty chunk is written back. For example, when attempting to load a physical information block, or a chunk that includes a portion of a physical information block, from the non-volatile memory 220 into the cache physical information table 214 in the cache memory 210, the device controller 112 determines that no clean chunks are present in the cache physical information table 214, as described at 308 and 310 in the process 300. Accordingly, the device controller selects a dirty chunk from the cache physical information table 214 for eviction to make space available, as described at 310. The device controller writes back the physical information included in the dirty chunk to the non-volatile memory 220.

As described previously, in some implementations, the device controller 112 selects a new physical information block in the non-volatile memory 220 and commits the information of the selected dirty chunk from the cache memory 210 into the new physical information block in the non-volatile memory 220. In such implementations, the device controller 112 writes back the entire physical information from the chunk in the cache physical information table 214 to the new physical information block in the non-volatile memory 220. Then the device controller 112 updates the location for the corresponding physical information block in the global directory 212 to point to the new non-volatile memory location of the new physical information block.

In some implementations, the device controller 112 looks up, by checking the global directory 212, the location in the non-volatile memory 220 of the physical information block corresponding to the selected dirty chunk. Then the device controller 112 accesses the physical information block in the indicated location in the non-volatile memory 220, and updates the content of the physical information block with the information of the selected dirty chunk from the cache memory 210.

In some implementations, the device controller updates the entire information in the existing physical information block in the non-volatile memory with the physical information content of the chunk in the cache physical information table 214. In some other implementations, the device controller 112 identifies the dirty physical information pages in the chunk, e.g., based on checking the validity status bits of the chunk entries to identify which physical information pages are invalid. In such cases, the device controller 112 updates only the physical information pages in the physical information block that correspond to the dirty physical information pages in the chunk in the cache physical information table.

At 504, the dirty flag for the chunk is reset. For example, following storing the updated information in the selected dirty chunk in the non-volatile memory 220, the device controller 112 resets the dirty flag for the chunk in the cache physical information table 214. A new chunk is subsequently loaded from the non-volatile memory 220 to replace the existing chunk, as described with respect to 312 in the process 300.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for managing physical information of memory units in a memory device, the method comprising:
   receiving a request to access physical information of a memory unit included in the memory device, wherein the physical information of the memory unit indicates a physical condition of the memory unit, and wherein the physical information of the memory unit is distinct from user data stored in the memory unit;
   in response to receiving the request, determining whether the physical information of the memory unit is available in a table present in a memory cache, the table storing information corresponding to a subset of a total number of physical information blocks that include physical information of a plurality of memory units in the memory device;
   conditioned on determining that the physical information of the memory unit is available in the table, accessing the physical information of the memory unit from the table; and
   conditioned on determining that the physical information of the memory unit is not available in the table:
      accessing a global directory present in the memory cache, the global directory indicating locations in a non-volatile memory that store the total number of the physical information blocks,
      determining, from the global directory, a particular location in the non-volatile memory storing a particular physical information block that includes the physical information of the memory unit,
      in response to the determination, loading the particular physical information block from the particular location in the non-volatile memory into the table, and
      accessing the physical information of the memory unit from the particular physical information block loaded into the table.

2. The method of claim 1, wherein the table stores one or more memory chunks, each memory chunk including one or more entries that store physical information of one or more memory units included in a physical information block in the subset of the total number of physical information blocks,
   wherein determining whether the physical information of the memory unit is available in the table comprises determining whether a memory chunk corresponding to the particular physical information block is present in the table, and
   wherein the global directory includes entries indicating locations in the non-volatile memory that store a total number of memory chunks corresponding to the total number of physical information blocks.

3. The method of claim 1, wherein the table stores one or more memory chunks, each memory chunk including one or more entries that store physical information of one or more memory units included in a physical information block in the subset of the total number of physical information blocks, and
   wherein loading the particular physical information block from the particular location in the non-volatile memory into the table comprises:
      accessing, in the particular location in the non-volatile memory, a particular memory chunk corresponding to the particular physical information block; and
      loading the particular memory chunk into the table.

4. The method of claim 3, wherein loading the particular memory chunk into the table comprises:
   identifying an existing memory chunk present in the table for eviction;
   determining whether physical information of one or more memory units associated with the existing memory chunk have been updated;
   conditioned on determining that the physical information of the one or more memory units associated with the existing memory chunk have not been updated, replacing the existing memory chunk with the particular memory chunk; and
   conditioned on determining that the physical information of the one or more memory units associated with the existing memory chunk have been updated:
      determining, from the global directory, a second location in the non-volatile memory storing a second physical information block corresponding to the existing memory chunk,
      in response to determining the second location, accessing the second physical information block in the non-volatile memory,
      identifying one or more memory units in the second physical information block that correspond to the one or more memory units associated with the existing memory chunk with the updated physical information,
      updating physical information for the identified one or more memory units in the second physical information block with the updated physical information from corresponding memory units in the existing memory chunk, and
      replacing the existing memory chunk with the particular memory chunk.

5. The method of claim 4, wherein each memory unit in the table includes a dirty flag that indicates whether the physical information of the memory unit has been updated, and
   wherein determining whether the physical information of the one or more memory units associated with the existing memory chunk have been updated comprises:
   for each of the one or more memory units, checking a status of an associated dirty flag;
   conditioned on the associated dirty flag being a first value, determining that the physical information for the memory unit has been updated; and
   conditioned on the associated dirty flag being a second value, determining that the physical information for the memory unit has not been updated.

6. The method of claim 4, wherein each memory unit in the table includes a dirty flag that indicates whether the physical information of the memory unit has been updated, and
   wherein updating the physical information for the identified one or more memory units in the second physical information block with the updated physical information from corresponding memory units in the existing memory chunk comprises:
   in response to updating the physical information for the identified one or more memory units in the second physical information block, clearing values of one or more dirty flags associated with the corresponding memory units in the table.

7. The method of claim 1, further comprising monitoring physical status for one or more memory units present in the table, and
wherein receiving the request to access the physical information of the memory unit comprises:
receiving a request to update the physical status of the memory unit; and
in response to receiving the request to update the physical status of the memory unit:
updating an entry in the table that is associated with the memory unit, the entry including physical information of the memory unit, and
setting a dirty flag associated with the entry to a first value that indicates that the physical information of the memory unit associated with the entry has been updated.

8. The method of claim 7, wherein monitoring the physical status for the one or more memory units comprises, for each memory unit, checking at least one of a threshold voltage setting, a health status or a validity status, and
wherein updating the entry in the table that is associated with the memory unit comprises updating one or more bits included in the entry, the one or more bits representing at least one of a threshold voltage setting for the memory unit, a health status for the memory unit, a validity status for the memory unit, an encode type for content of the memory unit, a bit error rate for the memory unit, or one of an erase, program, or read count for the memory unit.

9. The method of claim 8, wherein receiving the request to update the physical status of the memory unit comprises:
receiving the request to update the physical status of the memory unit following a read or write operation for the memory unit.

10. The method of claim 1, wherein a memory unit includes one of a memory block, a memory page, or a memory sub-page.

11. The method of claim 1, wherein a physical information block stores physical information indicating a physical condition of a corresponding memory unit that stores user data.

12. A memory system comprising:
a non-volatile memory that includes a plurality of memory units;
a cache memory that is coupled to the non-volatile memory; and
a device controller that is coupled to the non-volatile memory and the cache memory, the device controller configured to perform operations comprising:
receiving a request to access physical information of a memory unit included in the non-volatile memory, wherein the physical information of the memory unit indicates a physical condition of the memory unit, and wherein the physical information of the memory unit is distinct from user data stored in the memory unit;
in response to receiving the request, determining whether the physical information of the memory unit is available in a table present in the cache memory, the table storing information corresponding to a subset of a total number of physical information blocks that include physical information of a plurality of memory units;
conditioned on determining that the physical information of the memory unit is available in the table, accessing the physical information of the memory unit from the table; and
conditioned on determining that the physical information of the memory unit is not available in the table:
accessing a global directory present in the cache memory, the global directory indicating locations in the non-volatile memory that store the total number of the physical information blocks,
determining, from the global directory, a particular location in the non-volatile memory storing a particular physical information block that includes the physical information of the memory unit,
in response to the determination, loading the particular physical information block from the particular location in the non-volatile memory into the table, and
accessing the physical information of the memory unit from the particular physical information block loaded into the table.

13. The memory system of claim 12, wherein the table stores one or more memory chunks, each memory chunk including one or more entries that store physical information of one or more memory units included in a physical information block in the subset of the total number of physical information blocks,
wherein determining whether the physical information of the memory unit is available in the table comprises determining whether a memory chunk corresponding to the particular physical information block is present in the table, and
wherein the global directory includes entries indicating locations in the non-volatile memory that store a total number of memory chunks corresponding to the total number of physical information blocks.

14. The memory system of claim 12, wherein the table stores one or more memory chunks, each memory chunk including one or more entries that store physical information of one or more memory units included in a physical information block in the subset of the total number of physical information blocks, and
wherein loading the particular physical information block from the particular location in the non-volatile memory into the table comprises:
accessing, in the particular location in the non-volatile memory, a particular memory chunk corresponding to the particular physical information block; and
loading the particular memory chunk into the table.

15. The memory system of claim 14, wherein loading the particular memory chunk into the table comprises:
identifying an existing memory chunk present in the table for eviction; and
determining whether physical information of one or more memory units associated with the existing memory chunk have been updated;
conditioned on determining that the physical information of the one or more memory units associated with the existing memory chunk have not been updated, replacing the existing memory chunk with the particular memory chunk; and
conditioned on determining that the physical information of the one or more memory units associated with the existing memory chunk have been updated:
determining, from the global directory, a second location in the non-volatile memory storing a second physical information block corresponding to the existing memory chunk,
in response to determining the second location, accessing the second physical information block in the non-volatile memory, identifying one or more memory units in the second physical information block that correspond to the one or more memory units associated with the existing memory chunk with the updated physical information, updating physical information for the identified one or more memory units in the second physical information block with the updated physical information from corresponding memory units in the existing memory chunk, and replacing the existing memory chunk with the particular memory chunk.

16. The memory system of claim 15, wherein each memory unit in the table includes a dirty flag that indicates whether the physical information of the memory unit has been updated, and wherein determining whether the physical information of the one or more memory units associated with the existing memory chunk have been updated comprises:

for each of the one or more memory units, checking a status of an associated dirty flag;

conditioned on the associated dirty flag being a first value, determining that the physical information for the memory unit has been updated; and conditioned on the associated dirty flag being a second value, determining that the physical information for the memory unit has not been updated.

17. The memory system of claim 15, wherein each memory unit in the table includes a dirty flag that indicates whether the physical information of the memory unit has been updated, and wherein updating the physical information for the identified one or more memory units in the second physical information block with the updated physical information from corresponding memory units in the existing memory chunk comprises:

in response to updating the physical information for the identified one or more memory units in the second physical information block, clearing values of one or more dirty flags associated with the corresponding memory units in the table.

18. The memory system of claim 12, wherein the device controller is further configured to monitor physical status for one or more memory units present in the table, and wherein receiving the request to access the physical information of the memory unit comprises:

receiving a request to update the physical status of the memory unit; and in response to receiving the request to update the physical status of the memory unit:

updating an entry in the table that is associated with the memory unit, the entry including physical information of the memory unit, and setting a dirty flag associated with the entry to a first value that indicates that the physical information of the memory unit associated with the entry has been updated.

19. The memory system of claim 18, wherein monitoring the physical status for the one or more memory units comprises, for each memory unit, checking at least one of a threshold voltage setting, a health status or a validity status, and wherein updating the entry in the table that is associated with the memory unit comprises updating one or more bits included in the entry, the one or more bits representing at least one of a threshold voltage setting for the memory unit, a health status for the memory unit, a validity status for the memory unit, an encode type for content of the memory unit, a bit error rate for the memory unit, or one of an erase, program, or read count for the memory unit.

20. The memory system of claim 12, wherein the non-volatile memory includes one of a NAND flash memory, NOR flash memory, or phase change memory (PCM), and wherein the cache memory includes one of a static random access memory (SRAM), dynamic random access memory (DRAM) or resistive random access memory (RRAM).

21. The memory system of claim 12, wherein a memory unit includes one of a memory block, a memory page or a memory sub-page.

22. The memory system of claim 12, wherein a physical information block stores physical information indicating a physical condition of a corresponding memory unit that stores user data.

* * * * *